May 8, 1962 H. M. SIERRA 3,033,455

MULTIPLIER SYSTEM

Filed June 8, 1959 3 Sheets-Sheet 1

Huberto M. Sierra,
INVENTOR.
BY
Robert H. Fraser
ATTORNEY.

MULTIPLIER SYSTEM

Filed June 8, 1959 3 Sheets-Sheet 2

MULTIPLIER SYSTEM

Filed June 8, 1959 3 Sheets-Sheet 3

ILLUSTRATIVE MULTIPLICATION

United States Patent Office 3,033,455
Patented May 8, 1962

3,033,455

MULTIPLIER SYSTEM

Huberto M. Sierra, San Jose, Calif., assignor to International Business Machines Corporation, New York, N.Y., a corporation of New York Filed June 8, 1959, Ser. No. 818,759
10 Claims. (Cl. 235—160)

This invention relates to data handling systems, particularly to arithmetic units for such systems, and more particularly to a new and improved digital multiplication system.

In attempts to increase the speed and reliability of arithmetic units used in digital processing systems, various techniques have been devised to increase the speed of multiplication operations, inasmuch as multiplication steps often consume a considerable proportion of the time required to process data. Many of the multiplication techniques have been evolved from various addition operations which themselves have often been relatively slow.

More recently, however, the speed with which addition can be effected has been markedly increased by the use of matrices arranged to operate as addition tables. These matrices have employed bistable memory elements, such as magnetic cores, together with multiple address circuitry. Each matrix is defined by a number of input conductors lying parallel to one coordinate direction and which are interleaved with a number of other input conductors lying parallel to another coordinate direction. The individual magnetic cores are placed at the different points of intersection of individual conductors in the two coordinates, and each core is threaded by the two conductors. Each core is operated only when both its intersecting conductors are energized. The position of each core may have a unique designated value dependent upon the relative position of the two conductors in the matrix. Thus, one factor for an arithmetic operation may control one set of inputs, and another factor may control the other set of inputs, so that individual cores in the matrix are operated depending upon the values of the respective input factors. The input factors are the addend and augend, if the addition operation is to be performed. Output windings may be threaded in patterns through some numerically related ones of the cores in the matrix to provide indications of the result for each arithmetic operation.

Such matrix arrangements have also been employed in multiplication systems. When so employed, a multiplicand factor is applied to one input, and a multiplier factor to the other, and the core which is operated represents the value of the product of the two digits. Such arrangements operate satisfactorily for single multiplication operations. It is highly desirable, however, to be able to complete a multiplication operation which involves many digits provided in sequence, and to accomplish this operation in the shortest possible time, without decrease in system reliability. If such results can be obtained, the systems in which the arithmetic units are employed may be materially improved.

It is therefore an object of the present invention to provide a high-speed arithmetic unit suitable for executing multiplication operations.

It is yet another object of this invention to provide a reliable multiplication system for digital data processing equipment, which multiplication system has extremely high speed and reliability.

It is a further object of this invention to provide a multiplication system for decimal digital data processing systems.

It is a still further object of this invention to provide an extremely high-speed digital multiplier utilizing magnetic cores to effect multiplication of multi-digit numbers.

Multiplier systems in accordance with the invention may utilize a number of planes, or matrices, of memory elements, each matrix providing a multiplication table for the multiplication of two digits. The multiplier and multiplicand values are inserted into a matrix by the energization of individual input lines in two rectangular coordinates and the product value is determined by the position at which a core is operated. Through the use of a number of matrices, and particular relationships between the windings and the matrices, the present invention provides features by which multi-digit numbers may be multiplied much more quickly than was heretofore feasible. For numbers expressed in a decimal base, for example, nine planes of memory elements are employed. In this arrangement, the product values represented at like coordinate positions in the different planes differ by a constant carry term which varies incrementally with the successive planes.

In each plane, the different possible right-hand, or lower order values of the product are sensed by individual result windings which thread cores having like lower order digits. For each plane also, other and different carry windings thread those cores having like left-hand product values. Therefore, the result windings provide digital signals which constitute a part of the multi-digit product, and the carry windings provide digital signals which signify the carry which is so be utilized in the next multiplication step. Each matrix also includes windings to inhibit operation of the cores of the matrix during read-in of the multiplier and multiplicand. Control circuits are provided to operate the inhibit windings of all but one of the matrices in dependence upon the carry value which was established in the last previous multiplication step. As a consequence, the carry values from each operation are automatically added into the next multiplication of two digits. As successive multiplier and multiplicand digits are fed into the system, the system shifts operatively between the different planes and automatically and properly combines carry values into succeeding multiplication steps.

A better understanding of the features of the invention may be had from a reading of the following detailed description and by reference to the drawings, in which like reference numerals refer to like parts, and in which.

A system for practicing the present invention will be described as it may be constructed for an arithmetic unit of a digital data processing system. The present arrangement is described as a multiplication system only, although it will be understood that, where desired, various combinations of arithmetic functions may be performed by the same circuitry. For ease of understanding, the multiplication system is described as constructed for decimal operation, although it will also be understood that other numbers bases may be employed. With a decimal system, it is convenient to distinguish the digits in the different places of a number separately as lower order or higher order digits or, alternatively, as units digits, or tens digits. The factors to be multiplied are provided as multi-digit numbers, one of which is termed the multiplier, and the other of which is termed the multiplicand, with the result of the muliplication operation being designated as the product or the product value.

Figure 1:
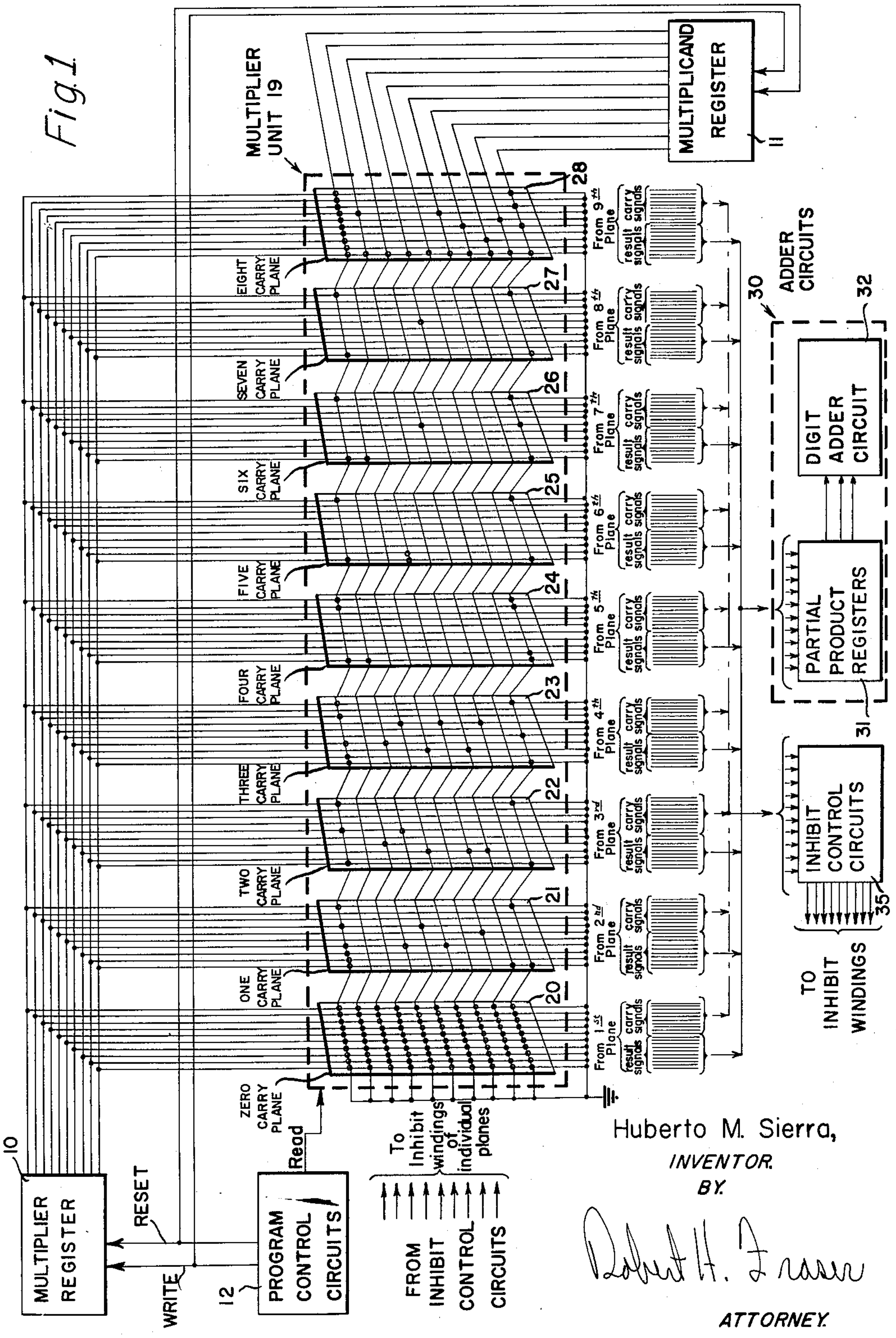
FIG. 1 is a simplified block diagram and partial perspective view of one arrangement of a multiplication system utilizing multiplication planes in accordance with the present invention.

Reference may now be made to FIG. 1, which shows the general arrangement of elements of a multiplication system in accordance with the present invention. A number of associated elements have been illustrated for clarity, although other systems may practice the invention without utilizing some or all of these elements. The associated elements which are referred to are those which provide inputs to and derive outputs from the multiplication system, and those which control the timing and sequencing of operations. For simplicity, further details of the functions and arrangement of the associated system have not been included.

Input signals to the multiplication system are provided in the present example from two multi-digit storage units, one of which is here called the multiplier register 10 and the other of which is called the multiplicand register 11. Each of these registers 10 and 11 provides signals representative of a decimal value on one of a group of ten input lines or windings. These input signals are provided under control of associated program control circuits 12 which provide sequencing functions of a simple nature for the present system. The program control circuits 12 may provide start and reset pulses to the various elements to place the system in condition for beginning operation. The control circuits 12 also provide write and read signals at discrete and selected intervals to control the orderly progression from one multiplication step to another.

The ten input digit lines from the multiplier register 10 and the multiplicand register 11 are arranged to provide inputs to selected coordinate positions in multiplier unit 19. The multiplier unit 19 consists of nine memory planes or matrices 20—28, respectively. The memory planes 20—28 are magnetic core matrices of the coincident current type previously described. Each consists of what may be termed vertical columns and horizontal rows of bistable magnetic elements. Each input line lies along a different position in one of the two coordinates, and threads the cores lying along that position, so that each core is threaded by two lines, one in each coordinate direction.

Figure 2:
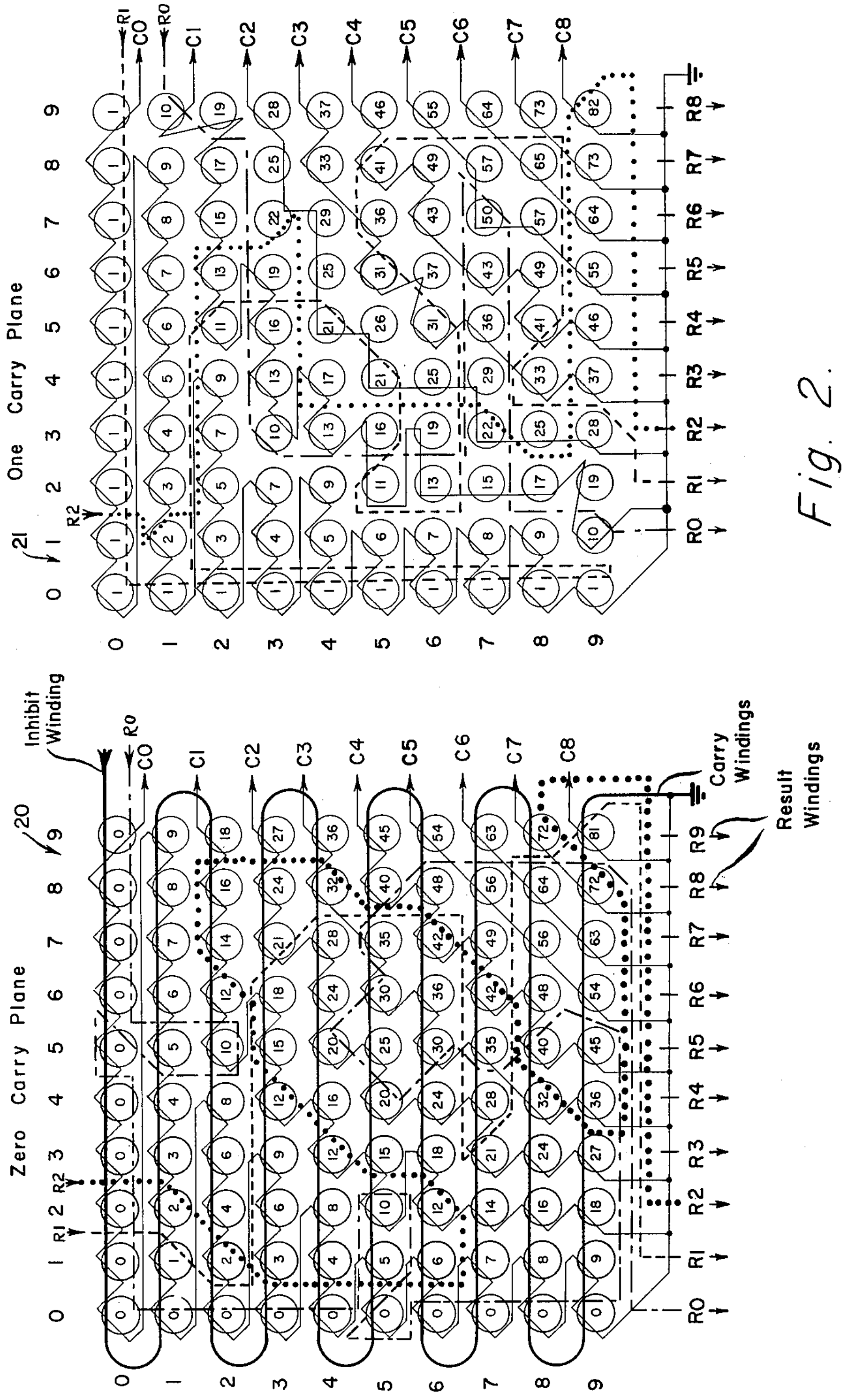
FIG. 2 is a simplified chart of two representative multiplication planes as utilized in the arrangement of FIG. 1.

The cores in each of the planes 20—28 are also threaded by output and control windings illustrated in detail with respect to FIG. 2 which follow separate but related patterns within the successive memory planes 20—28. In accordance with these patterns, each of the planes 20—28 may be considered to represent a certain carry value. Thus, the first memory plane 20 may also be called the zero carry plane 20. The next succeeding memory plane may thus be called the second or "one carry" plane 21, and so on to the last of the nine, which is the "eight carry" plane 28.

Output signals provided from each of the memory planes 20—28 represent two different portions of the product value.

One set of output conductors from the memory planes 20—28 provides the lower order decimal digits in the product value and these conductors will be termed the result or digital output lines. Signals on the digital output lines correspond to the right-hand value of a digital product. The other set of output lines from the memory planes 20—28 are utilized to represent the higher order value, which is the carry signal or left-hand portion of the product value. For purposes of description in functional terms, these lines may be referred to as the inhibit control lines. It may thus be seen that the planes 20—28 provide the function of multiplication tables, and may be referred to as multiplication planes.

The digital output lines from the planes 20—28 are coupled together into a single group of digital output lines which are applied to adder circuits 30. The adder circuits 30 may contain partial product registers 31 for momentary storage of partial products developed by the multiplication unit 19. By way of example, the partial product registers 31 may consist of shift registers arranged to receive decimal valued signals and to store separate and successive partial products. Outputs from the partial product registers 31 may then be applied to a digit adder circuit 32, the output of which may represent the final product output of the system. Addition of the numbers from the partial product registers 31 may be accomplished by a wide variety of digit adder circuits 32 including full or half carry circuits as may be desired.

The carry or inhibit control signals from the multiplier unit 19 are also grouped together so as to represent like digital values on common lines. These lines correspond individually to carry values which vary from zero to eight, the carry of nine or more not occurring in the multiplication of two decimal digits. The inhibit control circuits 35 to which these lines are coupled provide control of the memory planes 20—28 during operation in successive multiplication steps. Circuits corresponding to the inhibit control circuits 35 are well known and, accordingly, have not been illustrated in detail but will merely be described.

These circuits 35 perform the function of responding to signals on a single carry output line from the multiplier unit 19 and thereafter providing, until reset, inhibit signals on the inhibit windings of all but a selected one of the memory planes 20—28. This function may be provided, for example, by a group of bistable multivibrators or flip-flops which are intercoupled. When any one of the flip-flops is set, that flip-flop cause all the others to be reset, thus providing the desired inhibit output signals from all but the selected flip-flop. This function may also, of course, be provided by matrices of diodes, or by other circuitry arranged in accordance with logical principles.

Another functional unit which has not been included, in order to simplify the drawings, but the use of which can readily be visualized by those skilled in the data processing arts, is a sensing circuit or counter for determining when a multiplication operation is complete. Clearly, with multi-digit numbers of a fixed maximum length, the multiplication operation may proceed through a fixed number of steps. Similarly, with variable length numbers having coded terminating symbols, the multiplication operation may proceed through a variable number of steps. The end of the multiplication may therefore be determined by the detection of either the maximum number of steps (with fixed length numbers), by the detection of coded terminating symbols, or by the detection of the final values of the multiplier and multiplicand.

Reference may now be made to FIG. 2, which illustrates by way of example the manner in which output windings are threaded through the magnetic cores of two different memory planes 20 and 21. This figure also shows the relationships between the numerical product values which may be ascribed to each coordinate position in the two memory planes 20 and 21. As is described in more detail below, a definite relationship exists between the product values at corresponding coordinate positions in the successive planes 20—28. Accordingly, only two of the planes need be shown in detail to establish the example.

For decimal operation, the input digit lines corresponding to the multiplier set of inputs have, for each plane, been given individual designations of from zero through nine. Likewise, decimal values of from zero through nine have been assigned to the individual input digit lines which correspond to the multiplicand values. In the first or zero carry plane 20, the product value at each coordinate position corresponds to the decimal product of the two input digit lines. Thus, at the intesection of the input digit lines which correspond to column 5 and row 6, the product value is 30. In the second or one carry plane 21, however, the product value at the like coordinate position is increased by one, that is, it has a value of 31. Similarly, the value at each other coordinate position is greater in the one carry plane 21 than in the corresponding coordinate position in the zero carry plane 20 by a constant term of one. The same is true in each of the succeeding memory planes 22—28 which are not shown in FIG. 2. Stated in a slightly different way, in each of the memory planes 20—28, the product value at a given coordinate position in the plane is defined by the product of the values of the two corresponding input digit lines plus a constant term which varies in correspondence with the plane in which the product is being taken. The constant term is the carry term, and varies incrementally and successively with the series of memory planes 20—28.

Each of the ten result output digit windings for a plane 20—28 threads all of the cores having a selected particular right-hand or lower digit value. Thus, one result winding, designated here by R–0, threads all the cores at the product value coordinate positions which have a lower digit value of zero. The result output digit winding designated R–1 thus in like fashion threads all the cores having a right-hand digit product value of 1. Only three of these result windings have been illustrated for each plane, these being shown by dot-dash lines. The carry or inhibit control output windings, which are designated by the letter C, individually thread the cores at coordinate positions which have selected particular left-hand product values. Thus, winding C–0 intersects and threads all the cores having a zero in the higher order or left-hand portion of their product value. In like fashion, the carry output winding labeled C–5 threads all cores having a higher order digit product value of five. Rectifier devices, such as diodes, may be coupled into these lines if desired, to prevent transient current flow between the separate planes 20—28. The inhibit windings for each plane thread all cores in that plane. An inhibit winding is shown in the first plane only.

A brief explanation of the operation of the magnetic core elements of the memory planes 20—28 of FIGS. 1 and 2 will assist in explanation of the operation of the system. As may be seen in FIG. 3, each toroidal core 40 is threaded by both a vertical or column input digit line 41 representing a multiplier value and a horizontal or row input digit line 42 representing a multiplicand value. The input digit lines 41 and 42 correspond to the "write" or address lines for the core. The read line for the core 40 is another conductor 44 which threads the core 40 and all of the other cores in the same plane. An inhibit winding 45 additionally threads all of the cores in the plane. The two output windings, the result output digit line 46 and the carry output digit line 47 vary in digital value with the coordinate position at which the core 40 is located. Each of the output digit lines 46 and 47, however, provides an output signal in a like fashion.

Figure 4:
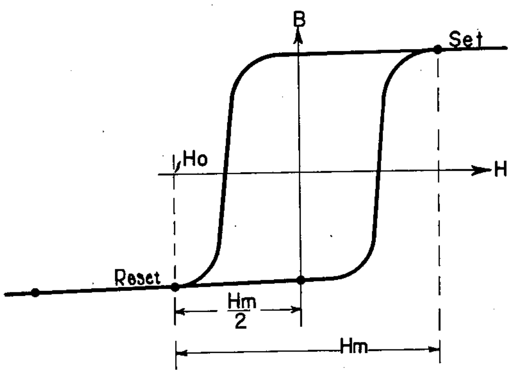
FIG. 4 is a chart showing a representative hysteresis curve for a memory element of the type shown in FIG. 3.

The relationship between the energizing currents in the input windings 41 and 42 and the inhibit winding 45 and the state of the magnetic core 40, together with the currents induced in the output windings 46 and 47, may be better understood by reference to the hysteresis curve of FIG. 4. Therein is shown a typical rectangular hysteresis characteristic for the ferromagnetic material usually employed for the magnetic core 40. One state of magnetization of the core may be considered to be a reset state, and the other to be a set state. Upon saturation of the core in either direction of magnetization, the core maintains the resultant reset or the set position until a magnetizing flux of opposite polarity and of sufficient density is applied to cause a reversal of the magnetization. The rectangular nature of the hysteresis curve and the capability which the magnetic core has for operating with many windings facilitates the use of the core in arithmetic operations.

As employed in the present example, the core is initially biased to the reset position, and remains at that point on the hysteresis curve until both input lines 41 and 42 are energized. The current in each input line 41 and 42 alone is sufficient only to generate a magnetomotive force $$\frac{H_m}{2}$$

as indicated in FIG. 4, which is sufficient only to oppose the retained field and not sufficient to place the core in the set condition. Energization of a single input line 41 or 42, therefore, does not cause a change in the magnetization state of the core. When both input lines 41 and 42 are energized, however, the magnetomotive force is $H_m$, which is sufficient to change the state of the core to the set condition. Although this change of state induces currents in the output windings 46 and 47, the output signals which are here utilized are induced by a read signal on the read winding 44, which reverses the state of the core from the set to the reset condition. The reversal of change of magnetization state due to the read signal accordingly induces currents in the result and carry output digit lines 46 and 47 if the core 40 was previously in the set state.

Figure 3:
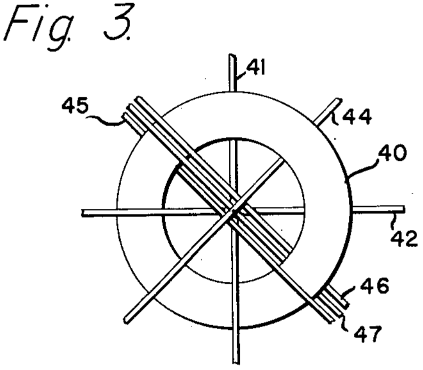
FIG. 3 is an enlarged and simplified view of a single memory element utilized in the arrangement of FIG. 1.

The function of the inhibit winding 45, which may be seen in FIG. 3 to be wound in an opposite polarity sense, is to provide a biasing magnetomotive force of $$\frac{H_m}{2}$$

on the core in the reset state. The inhibit winding 45, which threads all the cores in a given plane, thus prevents any of the cores 40 in that plane from being energized, because even though both input lines 41 and 42 are energized, the total magnetomotive force cannot, in the presence of the inhibiting force, exceed $$\frac{H_m}{2}$$

so that the core will not leave the reset state. Accordingly, in the presence of the inhibit signal, a memory plane may be said to be inactivated.

Figure 5:
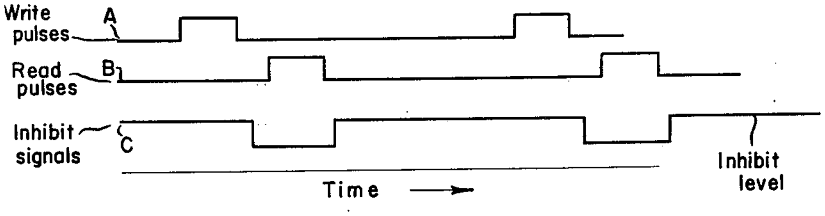
FIG. 5 is a chart of waveforms, showing typical timing signals which may occur in the system of FIG. 1.

The sequence of operation which occurs with respect to individual cores 40 and with respect to the memory planes 20—28 may be better understood with respect to FIG. 5, which shows the relative timing which may be employed for the input or write pulses, the read pulses and the inhibit signals. Each sequence is begun with the input or write signals, which activate only a selected single one of the planes 20—28, because all but one of the planes are inhibited. In the first digit multiplication of a series, the zero carry plane 20 is the only one which is not inhibited. Thus, depending upon the values of the multiplier and the multiplicand digits, and upon the previous carry, one core representing a given product value will be shifted to the set state. Thereafter, a read energizing current is applied to return all the cores of that plane to the reset state. The output carry signals which are derived as a result generate the inhibit control signal, which is thereafter maintained as a steady state condition until after application of the next succeeding write pulse.

The operation of the system as a whole may be visualized by consideration of the arangements of FIGS. 1 and 2, while bearing in mind the operation of individual elements exemplified by FIGS. 3–5. For multi-digit numbers, succesives multiplier and multiplicand digits are fed concurrently to the multiplier unit 19 from the individual registers 10 and 11. As each pair of digits are provided as input signals, only one of the memory planes 20—28 is not inactivated by an applied inhibit signal. In the memory plane selected for activation, therefore, one and only one core will be changed to the set state, depending upon the values of the input digits for the multiplier and the multiplicand. The product value represented by the core, however, is dependen both upon the values of the input digits and upon the value of the carry from the preceding operation, because the carry is inherent from the plane which has been selected. By thus selecting the plane in correspondence to the previous carry, and by thus varying the product values between planes in correspondence to the carry values, there is an automatic addition of carry from preceding multiplication steps. Furthermore, by utilizing the carry signal which is read out from the plane which has been activated in order to control the inhibition of all but a single plane in the next succeeding multiplication step, there is further an automatic storage of carry values. The significance of this automatic addition of carry and storage of carry is that the number of multiplication steps in a decimal multiplication process may be markedly reduced, and the multiplication process may be considerably simplified.

Figure 6:
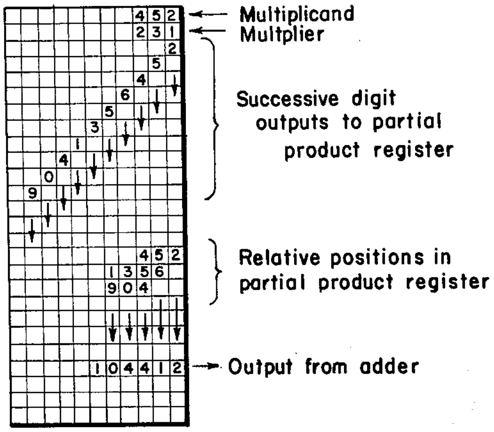
FIG. 6 is a diagram of a sample multiplication operation which will be useful in describing the operation of a system in accordance with the invention.

A further illustration of these features, and of other features of the invention, will be gained by reference to the example of a specific multiplication of two numbers which is shown in time sequence in FIG. 6. It is desired in this example to find the product of a multiplicand having a value 452 and a multiplier having a value 231. The multiplication of these two numbers is accomplished in ten successive steps, and the output from the digital multiplier unit 19 is indicated for each step.

In this process, of course, the registers 10 and 11 provide the digits of the multiplicand and multiplier from the registers 10 and 11 in succession, lowest digit first. Thus, as seen in FIG. 6, in the first three steps, the lowest order digit (a "1") of the multiplier is multiplied by the sequence 2, 5, 4, before the multiplier digit shifts to become the value 3. The partial product thus provided is stored in the partial product registers 31, and a shift of one digit place is made in the beginning point of storage for entry of the next partial product.

In this next partial product, covering the fourth to the seventh steps, may be seen an example of the automatic addition and use of carry. Without a carry signal, only the zero carry plane 20 can be activated by input signals. At step No. 5, however, when multiplying a digit of value 5 by a digit of value 3, a value of 15 results. The lower order digit, or right-hand product, of value 5 is provided as output. The carry or left-hand product value of 1 is applied to the inhibit control circuits 35 of FIG. 1 to cause inhibition of all but the second or one carry plane 21.

In the succeeding step, therefore, when the multiplican digit of value 4 is multiplied by the multiplier digit of value 3, the output is automatically provided from the coordinate position having the product value of 4 times 3 plus the constant carry term of 1. No matter what the digits being multiplied, therefore, the automatic feature provides for addition of the carry from the last previous step by virtue of the inclusion of the constant carry term in dependence upon the plane which is activated.

It may therefore be seen that the process of decimal multiplication, which has heretofore been cumbersome in the extreme, is appreciably speeded by the utilization of the present invention. Furthermore, as is well known, the utilization of magnetic core elements provides high speed capability but meets eminently satisfactory reliability standards. The readiness with which magnetic cores can be threaded by a number of input and output windings makes feasible the concurrent use of this structure for other arithmetic purposes in the arithmetic unit of a digital data processing system.

Another important factor which should be noted is that, because the product values are found in the form of a table, and because the system is not dependent upon extended arithmetic steps in determining values, the speed of the system is essentially independent of the values being multiplied. That is, the system operates at the same high rate of speed whether high valued digits, such as eights or nines, are being multiplied or not.

Although the system has been described in conjunction with a decimal based number system, it will be appreciated that other number bases, including binary, may be utilized as well. Furthermore, the system may employ other timing arrangements and sequences of operation.

There has been described above in detail a particular arrangement of a multiplier system as an example of one embodiment of the invention, but it will be appreciated that the invention is not limited thereto. Accordingly, any and all modifications, variations or equivalent arrangements falling within the scope of the annexed claims should be considered to be a part of the invention.

What is claimed is:

1. A sequentially operated arithmetic unit comprising a number of planes of memory elements which are spatially disposed and coordinately addressed within each plane to represent values corresponding to the product of two coordinate factors plus a constant term which is selected for each plane, first sensing circuit means for each of the planes, the first sensing circuit means being coupled to the memory elements of the planes so as to provide first signals representative of the different lowest order digits in the product values, second sensing circuit means for each of the planes, the second sensing circuit means being coupled to the memory elements of the planes so as to provide second signals representative of the different digits of the next higher order in the product values, and means coupled to the second sensing circuit means and to each of the planes for controlling the operation of the planes in accordance with the second signals.

2. In a multiplying system, a number of matrices of binary elements, each of the matrices having its binary elements disposed in first and second coordinate directions, input means threading the binary elements in each of the coordinate directions to provide input signals representing multiplier and multiplicand values, output circuits coupled to and operated by the binary elements in each of the matrices, a first of the output circuits being arranged to provide signals representative of lowest order digits in product values assigned to the binary elements, a second of the output circuits being arranged to provide signals representative of the next higher order digits in the product values assigned to the binary elements, and means coupled to each of the second of the output circuits and to the binary elements in each of the matrices to select matrices for operation in accordance with the signals from the second of the output circuits.

3. A multiplier system for providing automatic inclusion of carry in successive multiplication operations and including in combination a number of planes of memory elements, the memory elements in each of the planes being disposed in columns and rows with each element having a product value determined both by its column and row position and a constant term which varies incrementally between planes, two groups of input lines for each of the planes, the input lines being arranged to correspond to the columns and rows of the planes to operate selected ones of the memory elements, two groups of output lines for each of the planes to provide signals from operated memory elements, the different lines of a first of the groups coupling elements in the associated plane which have product values containing like lower order digits, the different lines of the second group coupling elements in the associated plane which have product values containing like digits of the next higher order, and inhibit control circuits coupled to the second group of output lines in each of the planes and also operatively coupled to each of the planes to inhibit operation of the memory elements of all but one of the planes dependent upon the higher order digit of the product value previously provided.

4. A multiplier system for providing a multi-digit product from multiplier and multiplicand digit values which are provided sequentially, the multiplier system comprising in combination a number of coordinately addressed memory planes, each consisting of a matrix of memory elements having product values corresponding to their coordinate positions in the plane, the product values of like coordinate positions in the different planes varying incrementally by carry terms which are constant with each plane, pairs of output circuits coupled to each of the different planes for providing right-hand and left-hand product value signals, respectively, and control circuits coupled to the output circuits which provide left-hand product signals from each of the planes and also coupled to the memory elements of each of the memory planes for controlling the operation of the planes so that only the memory elements of one plane can be operated during the multiplication of a pair of digits in accordance with the left-hand product value signal from the previous multiplication.

5. A sequentially operated multiplier system comprising a number of magnetic core matrices, each magnetic core in a matrix having a selected product value, with corresponding cores of successive matrices having product values which differ by an incrementally increasing constant, so that each matrix represents a multiplication table with a different included carry, each of the matrices including also at least a pair of groups of output sensing windings and an inhibit winding, individual windings in a first of the groups of output sensing windings threading selected ones of the cores in the matrix to establish right-hand partial products, the individual windings in a second of the groups of output sensing windings threading selecting ones of the magnetic cores in the matrix to establish left-hand partial products, the inhibit windings threading each of the magnetic cores in the matrix, and inhibit control circuits coupled to the inhibit windings of each of the matrices and coupled to the second group of output sensing windings of each of the matrices, in such manner that the magnetic cores of all but a selected one of the matrices are inhibited from operation during a given multiplication operation, the inhibition being controlled by the left-hand partial product of the last succeeding multiplication.

6. A multiplier system for multiplying multi-digit numbers, the digits of each of the numbers being represented by the presence of an input pulse on one of a plurality of input digit lines, the system comprising in combination a number of matrices of bistable magnetic cores, each of the matrices including first and second groups of input digit lines representing the numbers to be multiplied, said first and second groups of input digit lines threading the cores of the matrices in coordinate fashion so that a predetermined core in the matrix is selected for each combination of inputs to the matrix, each of the matrices including an inhibit winding to control operation of the cores of that matrix and also including two groups of output digit lines, the lines in a first group of the output digit lines being inductively coupled to the cores of the matrix in such manner that each line is coupled to the cores having like right-hand product values as determined by the product of the combination of inputs, plus a constant term, the constant term varying with the matrix in which the core is located, the lines of the second group of output digit lines being inductively coupled to the cores in the matrix in such manner that each line is coupled to the cores having like left-hand product values as determined by the product of the combination of inputs, plus the constant term, and a control circuit coupled to each of the second groups of output digit lines and coupled to the inhibit windings of the matrices for inhibiting operation of all but one of the matrices in dependence upon left-hand product values provided in the second groups of output digit lines.

7. A sequentially operated arithmetic unit for a digital data processing system comprising a number of planes of memory elements, each of the memory elements being of the type operable with a number of input, control and sensing conductors, each of the planes having memory elements spatially disposed and coordinately addressed to represent individual values corresponding to the product of two factors plus a constant term, the constant term changing incrementally with the successive individual planes, first groups of sensing circuits for each of the planes, each of the first groups of sensing circuits including conductors linking those memory elements of the plane which have like lower order product values, second groups of sensing circuits for each of the planes, each of the second groups of sensing circuits including conductors linking those memory elements of the plane which have like higher order product values, inhibit circuits coupled to each plane of memory elements, and control means coupled to the second groups of sensing circuits and to the inhibit circuits for controlling the selection of the planes to be employed in succeeding steps of an arithmetic sequence in accordance with the last output provided by the second groups of sensing circuits.

8. In a multiplying device, a number of coincident current memory matrices of magnetic binary elements, each of the matrices including a plurality of multiplicand conductors each of which threads the binary elements in a different row in one coordinate direction for selection of multiplicand values, each matrix also including a plurality of multiplier conductors, each of which threads the binary elements in a different row in the other coordinate direction for selection of multiplier values, the binary elements being positioned individually at the intersections of the multiplicand and multiplier conductors to define product value positions, input means coupled to the multiplier and multiplicand conductors for providing successive pairs of signals representing digits to be multiplied, an output sensing circuit for each of the matrices, each output sensing circuit including a number of conductors each threading magnetic binary elements which correspond to different lower order product digit values in a plane, the lower order product digit values differing between the matrices, in that corresponding product value positions differ by a constant carry term, each of the matrices also including a carry sensing circuit, each carry sensing circuit including a plurality of conductors each threading the magnetic binary elements which correspond to different carry values in the plane, and means including inhibit windings coupled to the magnetic binary elements of each of the matrices for selectively inhibiting operation of all but one of the matrices in response to signals provided by the carry sensing circuits.

9. In a multiplying system, a number of matrices of magnetic binary elements, each of the matrices having its magnetic binary elements disposed in rows in first and second coordinate directions, the rows in one direction having different value input conductors threading the binary elements therein to represent different multiplicand values, the rows in the other coordinate direction having different value input conductors threading the binary elements therein to represent different multiplier values, input circuits coupled to the input conductors for selectively operating one of the binary elements in accordance with multiplicand and multiplier values, reading circuits coupled to each of the matrices for reversing the state of an operated binary element therein, each of the matrices also including a pair of output circuits operated by the binary elements, one of the output circuits being arranged to provide lower order output product signals on one of a number of conductors, the second output circuit being arranged to provide higher order output product signals on one of a number of conductors, and a circuit for the control of selection of the matrix to be operated in the succeeding multiplication step, the circuit being coupled to the second output circuits and being coupled also to inhibit operation of the matrices in such fashion that only one matrix may have its magnetic binary elements operated at a time.

10. A magnetic core matrix multiplier for multiplying decimal digits represented by the presence of a pulse on a selected one of ten input digit lines and comprising in combination a first and a second set of ten input digit lines corresponding to the multiplicand and multiplier decimal inputs, a number of rectangular matrices of bistable magnetic cores, the cores in each matrix being arranged in columns corresponding to the first set of decimal input digit lines and also in rows corresponding to the second set of decimal input digit lines, the two sets of input digit lines intersecting, and the magnetic cores being individually positioned at the points of intersection so that coincident energization of the first and second digit lines intersecting a core is required to reverse the core from a first to a second stable state, each of the matrices also including a first group of decimal output digit lines, the lines of the first group representing the different right-hand decimal digits in the product value of the multiplication and each being inductively coupled to the cores in the matrix which represent the different right-hand decimal digits, the product values represented by the first group of output digit lines varying by an incrementally changing constant between the successive matrices, so that a core in a given matrix represents the decimal product of the input lines plus the carry for that matrix, each of the matrices also including a group of carry signal output lines representing the different left-hand decimal digits in the product value of the multiplication, the conductors of the carry signal output lines being inductively coupled to the cores in the matrix which represent the different left-hand decimal digits, the matrices also including individual inhibit windings threading all the cores therein for selectively deactivating the matrix, and control means coupled to the carry signal output circuits and to the inhibit circuits for inhibiting the operation of the cores in all but one of the matrices in dependence upon the last previous signal provided by the carry signal outputs.

References Cited in the file of this patent

UNITED STATES PATENTS

| | | |
|---|---|---|
| 2,241,591 | Gates | May 13, 1941 |
| 2,364,540 | Luhn | Dec. 5, 1944 |
| 2,515,692 | Boyden et al. | July 18, 1950 |